Sept. 10, 1940.  H. P. HAGGART  2,214,327
BELT REELING DEVICE FOR POULTRY BATTERY
Filed Nov. 4, 1939

INVENTOR
Harold P. Haggart

Patented Sept. 10, 1940

2,214,327

UNITED STATES PATENT OFFICE 2,214,327

BELT REELING DEVICE FOR POULTRY BATTERY

Harold Park Haggart, Oregon City, Oreg.

Application November 4, 1939, Serial No. 302,889

3 Claims. (Cl. 119—22)

This invention relates to improvements in belt reeling devices for poultry battery or other animal containing cages and to a method of centering the droppings belt when being reeled by said belt reeling device.

In multiple or battery type structures, containing poultry, belts are commonly arranged in a horizontal plane beneath the wire mesh which supports the fowls. Said belts, commonly termed droppings belts, are situated in a runway or on a platform or channel beneath each deck of poultry containing cages in said multiple type structures. Usually there are, in this type of machine, a plurality of horizontal decks tiered one above the other. The droppings belt when moved by a reel, positioned at an end of the battery, frequently tends to crowd against one side or the other of its runway and in doing so said belt is apt to become damaged along its border thus materially shortening the service life of the belt; the belt being "dog eared", bruised or torn along the margin.

The objects of my improvement are, first, to provide a droppings belt and a belt reel for winding said belt which reel is pivotable at one of its bearing ends, the arc of the pivot lying in a plane corresponding to that of the droppings belt when said belt is fully extended in a channel through a poultry battery, said pivoting of the reel on one of its bearings to effect centering of the droppings belt being reeled on said belt reel; second, to afford facilities for control of said belt reel in giving it pivoted motion in a plane longitudinal with said droppings belt; third, to provide means for scraping said droppings belt, such scraper means automatically adjusting itself to any angle taken by said droppings belt reel when said reel is being pivoted for belt centering purposes.

I attain these objects by mechanism illustrated in the accompanying drawing, in which—

Figure 1:
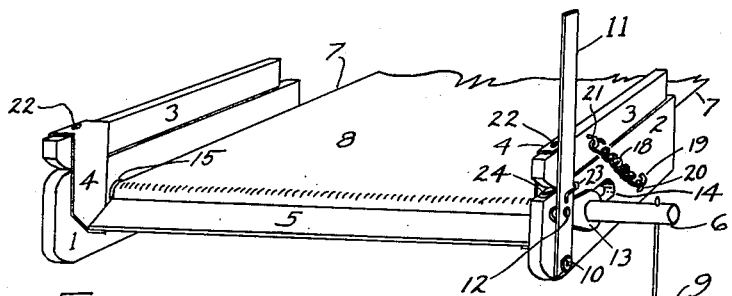
Figure 2:
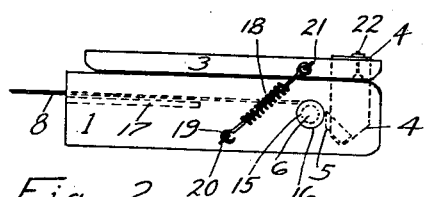
Figure 3:
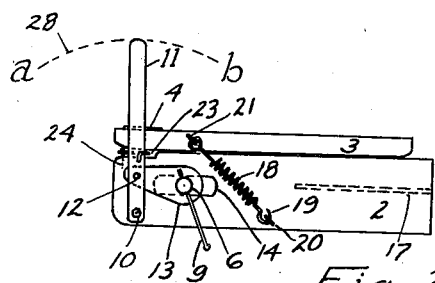
Figure 4:
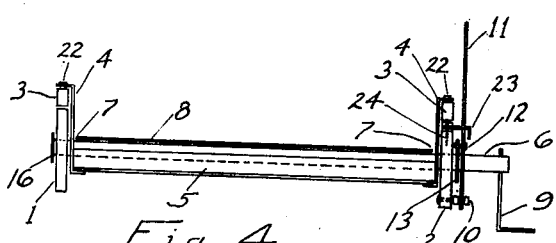

Figure 1 is a perspective view of the entire belt reeling device; Figure 2, a side view of the belt reeling device taken from the left of Fig. 1; Fig. 3, a side view of the device taken from the right of Fig. 1; Fig. 4 a front view of the device and Fig. 5, a side elevation showing a manner of attaching a plurality of belt reeling devices to a poultry battery, the end only of the battery being schematically illustrated and springs being omitted. Similar numerals refer to similar parts throughout the several views.

The side members 1 and 2 and the belt supporting table 17 which extends the full width of the droppings belt channel of a battery constitute the framework of the belt reeling device. In the side member 1 is a bearing 15 fixed to side member 1 in a stationary position. In side member 2 is an elongated opening 14 the top and bottom portions of which form a bearing surface for reel 6. Reel 6 is supported at its opposite end in bearing 15 and sufficiently loosely received in 15 to permit shifting reel 6 completely forward or back in the opening 14. A yoke 13 encircles reel 6 near the elongated opening or elliptical bearing 14. Yoke 13 is attached by pin 12 to lever 11 in such a manner that when 11 is moved forward or backward on hinge pin 10, yoke 13 is caused to force reel 6 forward or backward in opening 14. Thus if the margin 7 on the left side of droppings belt 8 crowds toward or against the left side of the belt channel while reel 6, being turned by crank 9 in reeling up said belt, by shifting lever 11 thru the arc 28 toward b, yoke 13 in forcing belt reel 6 in groove 14 toward the reeling belt tends to conduct belt 8 toward the right side of its channel. Shifting of belt 8 toward the right in the above instance is due to the fact that the previous wrap of the belt is displaced toward the left by the swiveling angle imparted to reel 6 thus tending to wrap the next layers of the reeling belt toward the right.

Scraper 5 is attached at either end by bracket 4 to runners 3. Runners 3 rest upon the top edge of side members 1 and 2. Helical compression spring 18, attached to each runner by link 21 and attached to side members 1 and 2 of the frame by hook 19 to eye 20 imparts a constant downward pressure of runners 3 on frames 1 and 2. Also springs 18 are set at an angle in such a manner that hooks 19 are situated considerably toward the rear of an imaginary line drawn vertically thru links 21. This causes a force upon runners 3 in a direction toward the rear of frame members 1 and 2 which is transmitted thru brackets 4 to scraper 5 which causes scraper 5 to rest firmly against droppings belt 8 when the latter is being reeled either upon or off of reel 6. Brackets 4 are sufficiently flexible to allow scraper 5 to follow the swiveling motion of reel 6 without materially drawing the rear ends of runners 3 to the right or left where in contact with frame supports 1 and 2. As belt 8 is being wound upon reel 6 and each succeeding layer entering upon the reel thickens the gradually increasing diameter about the reel, scraper 5 readily accommodates itself to the thickening diameter of the winding belt and at the same time the scraping edge of 5 is constantly retained centered against the front contour of the winding belt. This is accomplished by runners 3 supporting scraper 5 which move freely upon the top edges of 1 and 2, said runners being held under constant downward tension by helical compression springs 18.

The scraper assembly consisting principally of parts 5, 4 and 3 may be readily removed from the belt reeling device by unhooking the helical springs 18 at 19.

23 represents a centering hook which is hinged to the side member 2 of the reeling device frame. Hook 23 may be pushed out of the way of a free movement of lever 11 into a recess formed on the front top portion of 2 which recess permits free, unobstructed movement of runner 3 above the hook. As belt 8 which has been wound upon reel 6 is being pulled off of said reel and returned to its normal position beneath the poultry in the battery deck, it is necessary to hold reel 6 in its bearings with its axis at right angles to the margins 7 of the belt in order to prevent reel 6 from being pulled toward the rear of groove 14 which would result in forcing belt 8 to tend to crowd against the side wall of its channel. Reel 6 is held centered in groove 14 by hook 23. As shown in Figs. 1, 3 and 4 hook 23 is provided with a small right angle extension near the outer margin of the hook to prevent hook 23 from escaping too far into said recess. Said right angle extension to hook 23 rests against the side of 2 when said hook is not being used to center lever 11 rendering hook 23 readily available when needed.

Figure 5:
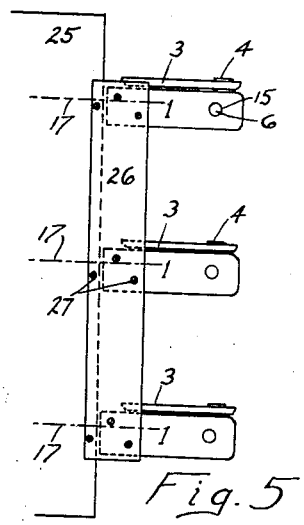

In Fig. 5, 25 represents a laying battery, illustrated schematically and which I do not claim. Fig. 5 serves to illustrate the relation of my droppings belt reeling device to the poultry battery, 26 being a support fastened to the battery and to which three belt reeling devices as described in this specification are attached. 17 of this figure (Fig. 5) illustrates schematically the location of the belt channel which ordinarily exists in poultry batteries equipped with droppings belts, which belt channel I do not claim. Helical springs have been omitted in Fig. 5.

Droppings belt 8 is drawn from a wound position on reel 6 by means situated at the opposite end of the battery. Such means for drawing belt 8 back into a normal outspread position in the battery I do not make a part of this specification and do not claim. I am aware that many changes may be made and numerous details of construction may be varied through a wide range without departing from the principles of this invention and I therefore do not propose limiting the patent granted thereon, otherwise than is necessitated by the prior art.

I claim as my invention:

1. In a belt reeling device for poultry battery, a frame consisting of two bearing supports rigidly attached to an end of a poultry battery, a bearing attached in a fixed position to one of said bearing supports, an elongated opening through the other bearing support said elongated opening being elongated horizontally, a reel one end of which is rotatably carried in said fixed bearing the other end of said reel being rotatably carried in said elongated opening, a lever hinged to said frame adjacent to said elongated opening, a yoke hinged to said lever, said yoke having a circular opening in which said reel is rotatably carried, also a belt windable upon said reel.

2. In a belt reeling device for animal containing cages, a droppings belt occupying a horizontal plane, a belt reel for winding said belt, a bearing positioned at one end of said reel in which said reel rotates, said bearing being held rigid with the frame of said animal containing cages, also a bearing positioned near the opposite end of said reel in which said reel rotates and which bearing is oblong with rounded ends with its longest axis lying in a plane parallel with that of said belt, said oblong bearing being also held rigid with the frame of said animal containing cages, a lever having a yoke for moving said reel forward or back through the long axis of said oblong bearing, said yoke encircling said reel adjacent to said oblong bearing, a detent positioned to hold said lever and yoke in such a position that the axis of said reel will be aligned at right angles to the longitudinal axis of said droppings belt, also a crank for rotating said reel.

3. In a belt reeling device combined with belt scraper for poultry battery, a frame consisting of two side panels attached rigidly to the end of a poultry battery, a reel rotatable in a circular hole in one of said side panels and in an oblong hole in the other of said panels, a lever hinged to one side panel adjacent to said oblong hole, said lever having a link positioned to encircle said reel adjacent to said oblong hole, said lever and link being for the purpose of shifting said reel to various positions in said oblong hole, means for holding said reel centered in said oblong hole consisting of a hook hinged to one side panel positioned to engage said lever, a droppings belt reelable upon said reel, a scraper for scraping said belt, two runners each of which rests upon the top edge of one of said side panels and each connected to said scraper by a flexible bracket apiece, and two helical compression springs one being attached to each of said runners and each hooked to one of said side panels.

HAROLD PARK HAGGART.